(12) United States Patent
McCarthy et al.

(10) Patent No.: US 9,675,095 B2
(45) Date of Patent: *Jun. 13, 2017

(54) PROCESS FOR SEASONING REDUCED FAT SNACKS

(71) Applicant: Diamond Foods, LLC, Stockton, CA (US)

(72) Inventors: Joe McCarthy, Portland, OR (US); Carolyn Richards Ottenheimer, Corvallis, OR (US)

(73) Assignee: S-L Snacks National, LLC, Charlotte, NC (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/320,527

(22) Filed: Jun. 30, 2014

(65) Prior Publication Data

US 2014/0370170 A1 Dec. 18, 2014

Related U.S. Application Data

(63) Continuation of application No. 13/285,961, filed on Oct. 31, 2011, now Pat. No. 8,765,203.

(51) Int. Cl.
*A23L 1/217* (2006.01)
*A23L 1/00* (2006.01)
*A23P 20/10* (2016.01)
*A23L 19/18* (2016.01)
*A23L 35/00* (2016.01)

(52) U.S. Cl.
CPC .............. *A23L 1/217* (2013.01); *A23L 19/18* (2016.08); *A23L 35/00* (2016.08); *A23P 20/11* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 2,020,533 A | 11/1935 | Zaloom | |
| 2,742,364 A | 4/1956 | Herbert | |
| 2,860,053 A | 11/1958 | Avera | |
| 4,647,463 A | 3/1987 | Hoover | |

(Continued)

FOREIGN PATENT DOCUMENTS

| | | |
|---|---|---|
| DE | 2705718 | 8/1978 |
| EP | 0267757 | 5/1988 |

(Continued)

OTHER PUBLICATIONS

ADA Reports, Position of the American Dietetic Association: Use of Nutritive and Nonnutritive Sweeteners, Journal of the American Dietetic Association, pp. 255-275 (2004).

(Continued)

*Primary Examiner* — Nikki H Dees
*Assistant Examiner* — Amber Cox
(74) *Attorney, Agent, or Firm* — Womble Carlyle Sandridge & Rice LLP

(57) ABSTRACT

A method for preparing a low-fat snack food fries the snack food, removes some of the oil accumulated by the frying, re-applies oil onto the surface of the snack food and then applying a seasoning or flavoring that adheres to the snack food via the surface coating of oil.

18 Claims, 2 Drawing Sheets

(56) References Cited

U.S. PATENT DOCUMENTS

| | | | |
|---|---|---|---|
| 4,756,916 A * | 7/1988 | Dreher | A23L 1/217 |
| | | | 426/302 |
| 4,769,248 A | 9/1988 | Wilkins et al. | |
| 4,910,028 A | 3/1990 | Bernacchi et al. | |
| 5,149,562 A | 9/1992 | Hebert et al. | |
| 5,391,383 A | 2/1995 | Sullivan et al. | |
| 5,595,780 A | 1/1997 | Zook | |
| 6,635,294 B2 | 10/2003 | Keijbets | |
| 8,071,148 B2 | 12/2011 | Silvester et al. | |
| 8,124,161 B2 | 2/2012 | Meijer et al. | |
| 8,372,467 B2 | 2/2013 | Caridis et al. | |
| 2008/0317907 A1 | 12/2008 | Thomas et al. | |
| 2010/0183771 A1 | 7/2010 | Mattson et al. | |

FOREIGN PATENT DOCUMENTS

| | | |
|---|---|---|
| EP | 0841012 | 5/1998 |
| WO | WO 83/00278 | 2/1983 |

OTHER PUBLICATIONS

United States Office Action, U.S. Appl. No. 13/285,961, Jun. 11, 2013, 8 pages.

* cited by examiner

PROCESS FOR SEASONING REDUCED FAT SNACKS

This application is a continuation of U.S. application Ser. No. 13/285,961 filed on Oct. 31, 2011 which is hereby incorporated by reference.

FIELD

The invention is in the field of processes for applying seasonings to low-fat snacks.

BACKGROUND

People are becoming more and more health conscious and thus paying closer attention to the amount of fat in the food they consume. Life for many people is still very fast-paced and thus people continue to purchase ready-to-eat snacks even though those traditionally containing more fat. Manufacturers of snack foods have developed various low-fat snacks but for snack foods to which seasonings and flavorings are adhered to the surface, such as chips, pretzels, and the like, there is a problem of the seasonings and flavorings not adhering as the amount of fat is reduced in the underlying food. In full fat varieties there is sufficient oil on the outside of the item to which the seasonings and flavorings adhere.

Thus there is a continuing need to develop processes for manufacture of low-fat snack foods that have sufficient flavor.

BRIEF SUMMARY

Low-fat snack foods that are sufficiently flavorful are prepared by frying the food, removing a portion of the oil that was introduced by frying, reintroducing some oil to the food by applying a coating of oil on the food and applying the desired flavor to the snack food. By coating the surface of the food with oil, sufficient flavoring will adhere to the surface to provide the desired flavor to the final product while still maintaining the reduced fat. The final food has the desired total lower amount of fat but still has sufficient oil on the surface to allow the seasoning to adhere to the surface.

The features and advantages described in this summary and the following detailed description are not all-inclusive. Many additional features and advantages will be apparent to one of ordinary skill in the art in view of the drawings, specification, and claims hereof.

DETAILED DESCRIPTION

The discussion herein relates to low-fat consumer packaged food items and to their methods of preparation and use. Each of the product components as well as product use and attributes and methods of their preparation are described in detail below.

Throughout this document, percentages are by weight and temperatures in degrees Fahrenheit unless otherwise indicated. Each of the US patents and US patent applications referenced herein are hereby incorporated by reference.

Figure 1:
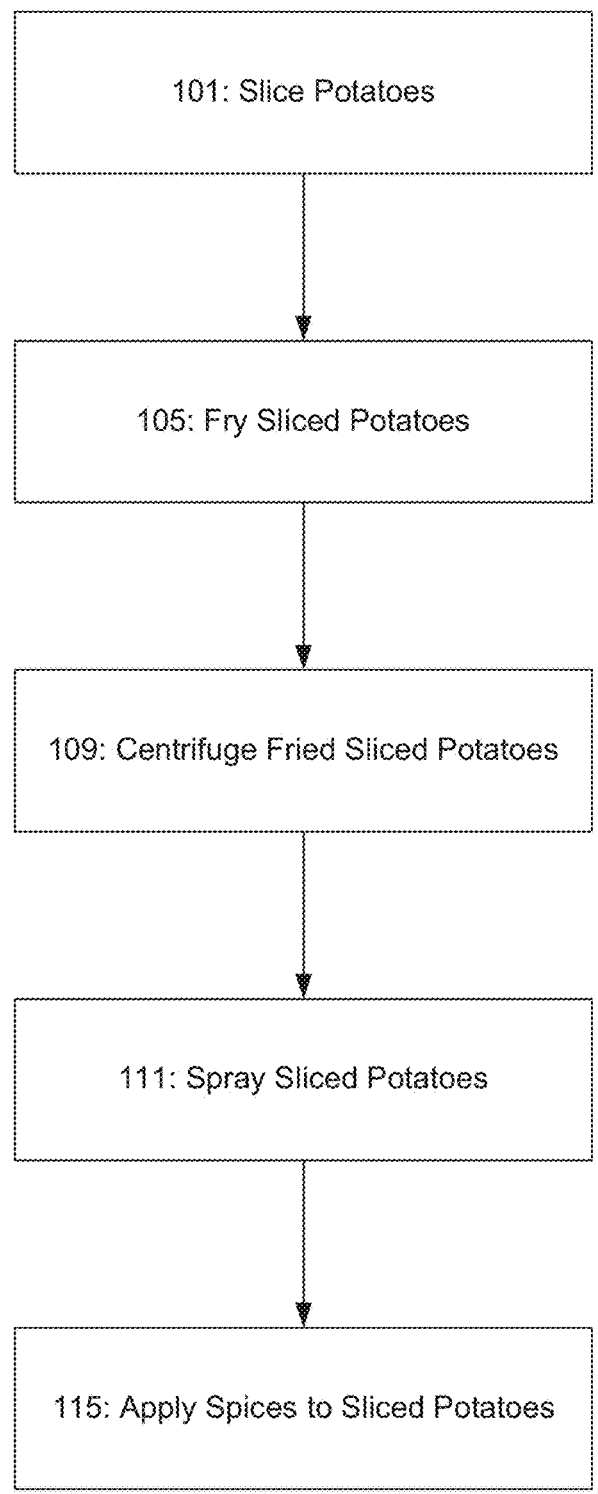
FIG. 1 is a flow diagram illustrating the method for frying and seasoning low-fat snacks.
Figure 2:
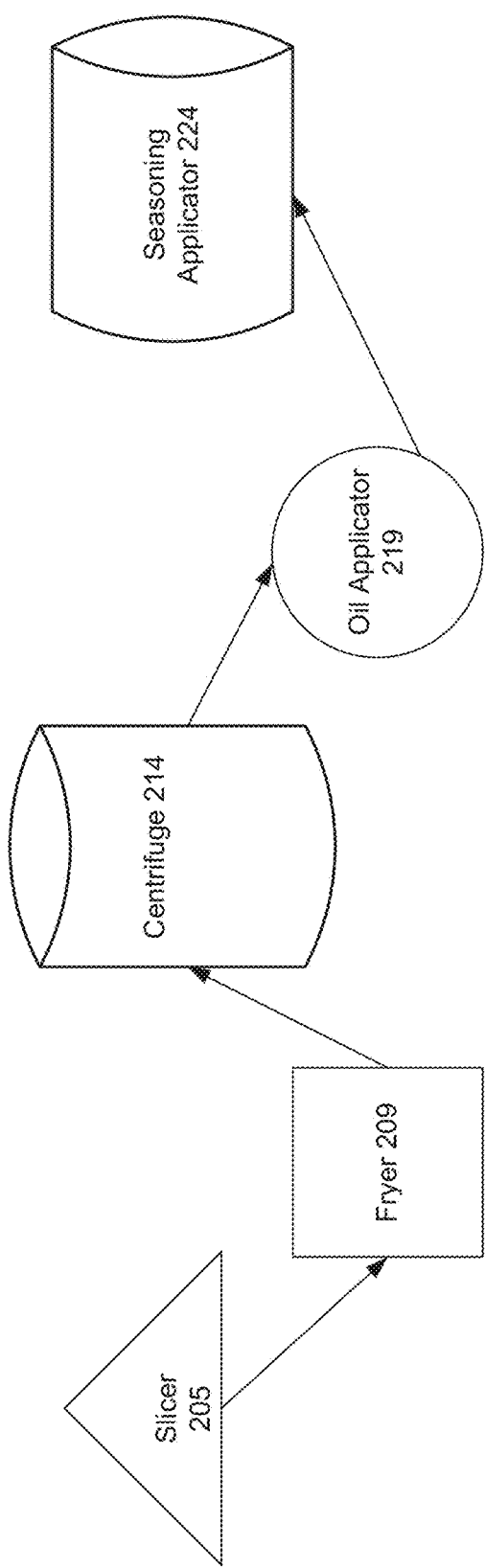
FIG. 2 is a diagram illustrating the operations and equipment for frying and seasoning low fat snacks.

Referring to FIGS. 1 and 2 the process is described in greater detail using the example of potato chips. Potatoes are sliced 101 in the slicer 205. Any kind of potatoes conventionally used for potato chips can be used with the disclosed method. In one embodiment, white chipping varieties of potatoes are used. Examples of suitable potatoes include, but are not limited to Yukon gold and Russet varieties. Any slicer 205 conventionally used for slicing potatoes can be used with the disclosed method. In one embodiment, Urschel centrifugal slicers are used. The potatoes can be sliced to the thickness that is desirable for the finished products. It is known in the art of potato chips to slice to varying thicknesses depending on marketing need.

The resulting potato chips are fried 105 in the fryer 209. Frying can be accomplished by any oil suitable for frying potatoes. Depending on the desired flavor profile, several oils are suitable. Examples include, but are not limited to, sunflower oil, safflower oil, canola oil and other vegetable oils. Preferred oils are those with high oleic acid content. In one embodiment, preferred oils have more than 50% oleic acid.

Potato slices enter the fryer when oil is between 290° F. and 305° F., between 295° F. and 305° F., or preferably about 300° F. and remain in the fryer for between 9 and 10 minutes. In one embodiment, the potato slices remain in the fryer about 9.5 minutes. The temperature of the oil drops when the potato slices enter the oil and increases again as the slices fry. In one embodiment, the oil drops to between 240° F. and 260° F. When the potato slices are done frying, the oil temperature is between 290° F. and 300° F. In one embodiment, the profile of the temperature change during the frying process is a U-shaped curve. Alternatively, it is a V-shaped curve. During the frying process, the potato slices absorb some of the frying oil. In one embodiment, the oil content of the fried slices is between 25% and 33%, between 27% and 31% or about 29%. The moisture content of the fried slices is between 3.1% and 3.9%, between 3.3% and 3.7% or about 3.5%.

Fried potato slices are centrifuged 109 in the centrifuge 214. Any centrifuge 214 conventionally used for snack foods can be used. In one embodiment hot air centrifuges are used. Examples include, but are not limited to hot air centrifuges available from Heat and Control Machinery or FOODesign Equipment. The slices are centrifuged for 2.5-3 minutes. The centrifuging occurs at between 400° F. and 440° F. The lower the temperature, the longer that the slices are centrifuged. Thus at 400° F., the slices would centrifuge for closer to 3 minutes and at 440° F., the slices would centrifuge for about 2.5 minutes. In other embodiments, the centrifuging occurs at 410° F. to 430° F. or 415° F. to 425° F. In a preferred embodiment, the centrifuging occurs at about 420° F. for about 2.7 minutes. The centrifuge rotates at between 490 to 510 rpm. In an embodiment, the centrifuge rotates at about 500 rpm. After centrifuging, the oil content of the potato slices is between 18.5% and 26.5%, between 20.5% and 24.5% or about 22.5% and the moisture content is between 1.9% and 2.7%, 2.1% and 2.5% or about 2.3%.

The centrifuged potato slices are now coated 111 with a spray of oil to add back additional oil and provide a layer to which seasoning adheres. Any applicator 219 suitable for spraying of higher viscosity liquids, like oils, can be used for this step. Suitable applicators 219 include, but are not limited to, those available from Spray Dynamic or Heat and Control. The oil used for spraying can be the same oil used to fry to maintain consistency in flavor or can be a different oil. A different oil may be suitable depending on the seasoning flavor. For example, for a Mediterranean flavor, olive oil may provide a desirable taste. Olive oil is however not suitable for frying so would not be used at the frying step but could be used for the spraying step. Sufficient oil is sprayed onto the slices to increase their total oil content by about 1.4% to 1.6% or preferably about 1.5%.

After the surface of the chips has had oil sprayed onto it, the chips are introduced into a seasoning drum. Any seasoning drum suitable for food may be used. Suitable seasoning drums include but are not limited to those available from Heat and Control and FOODesign. As the chips' surfaces are sufficiently tacky due to the applied oil, any desired seasoning can be adhered to the chips. In one embodiment, the seasoning is dry or in a powdered form. Example flavors that can be achieved include, but are not limited to, salt, salt and pepper, barbecue, sour cream and onion, and the like.

After preparation the chips are deposited into suitable containers for transport. Suitable containers include bags, boxes and the like. Suitable containers are of paper, foil or plastic or a combination thereof that withstands seepage of oil. Suitable containers also protect the chips during transport to minimize breakage.

While the disclosed method has been described in relation to potatoes it is not limited to potatoes. It may also be used for preparation of other fried snacks.

The invention claimed is:

1. A method for preparing seasoned reduced fat snacks comprising:
    frying the snack food in a first oil;
    centrifuging the snack food for between 2.5 and 3.0 minutes at between 400° F. and 440° F. to produce a reduced fat snack food;
    spraying a second oil on the reduced fat snack food; and
    applying a seasoning on the reduced fat snack food.

2. The method of claim 1 wherein frying the snack food in a first oil comprises:
    depositing the snack food in the first oil, the first oil having a temperature of between 290° F. and 305° F.; and
    removing the snack food from the first oil after about 9 to 10 minutes.

3. The method of claim 1 wherein frying the snack food in a first oil comprises:
    depositing the snack food in the first oil, the first oil having a first temperature of between 290° F. and 305° F.; and
    removing the snack food from the first oil when the first oil has a second temperature of between 290° F. and 300° F.

4. The method of claim 2 wherein the temperature is between 295° F. and 305° F.

5. The method of claim 4 wherein the temperature is about 300° F.

6. The method of claim 3 wherein the second temperature is about 295° F.

7. The method of claim 1 wherein frying the snack food in a first oil comprises:
    depositing the snack food in the first oil, the first oil having a temperature of between 290° F. and 305° F.; and
    removing the snack food from the first oil when the snack food comprises 28% and 31% first oil by weight.

8. The method of claim 7 wherein removing the snack food from the first oil when the snack food comprises 27% and 31% first oil by weight comprises removing the snack food from the first oil when the snack food comprises about 29% first oil by weight.

9. The method of claim 1 wherein the first oil comprises >50% oleic acid content.

10. The method of claim 1 wherein the first oil is sunflower oil or safflower oil.

11. The method of claim 1 wherein the first oil and the second oil are the same.

12. The method of claim 1 wherein centrifuging the snack food comprises centrifuging the snack food for about 2.7 minutes.

13. The method of claim 1 wherein centrifuging the snack food comprises centrifuging the snack food at between 415° F. and 425° F.

14. The method of claim 1 wherein centrifuging the snack food comprises centrifuging the snack food at about 420° F.

15. The method of claim 1 wherein centrifuging the snack food for between 2.5 and 3.0 minutes at between 400° F. and 440° F. further comprises centrifuging the snack food until the snack food comprises about 20.5% to 24.5% first oil by weight.

16. The method of claim 1 wherein spraying a second oil on the reduced fat snack food comprises increasing a percentage, by weight, of the first oil and the second oil in the reduced fat snack food by 1.4% to 1.6%.

17. The method of claim 16 wherein the percentage is increased by about 1.5%.

18. The method of claim 1 wherein the snack food comprises potato.

\* \* \* \* \*